INVENTOR.
Robert L. Holloway
BY Sommer & Weber
ATTORNEYS

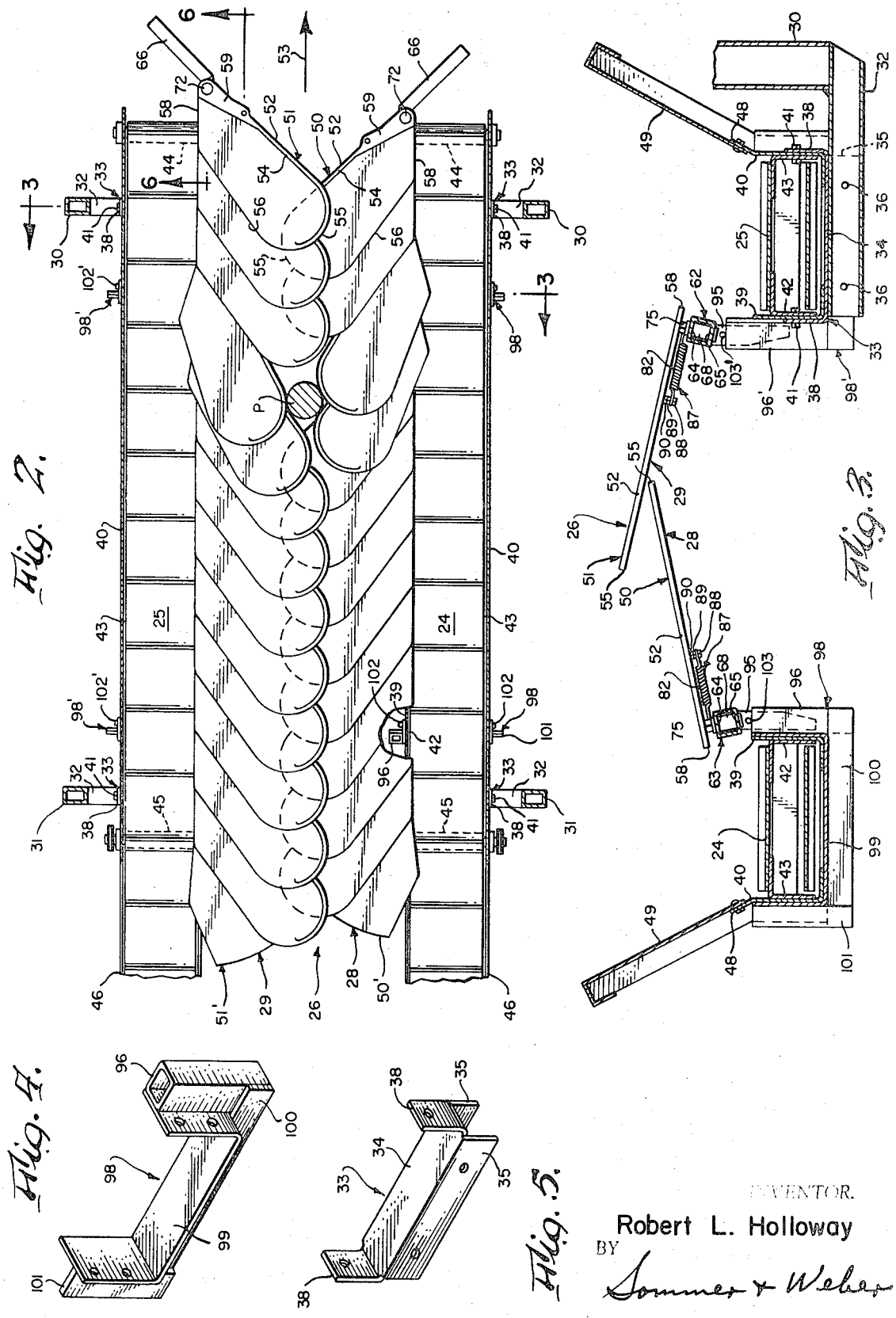

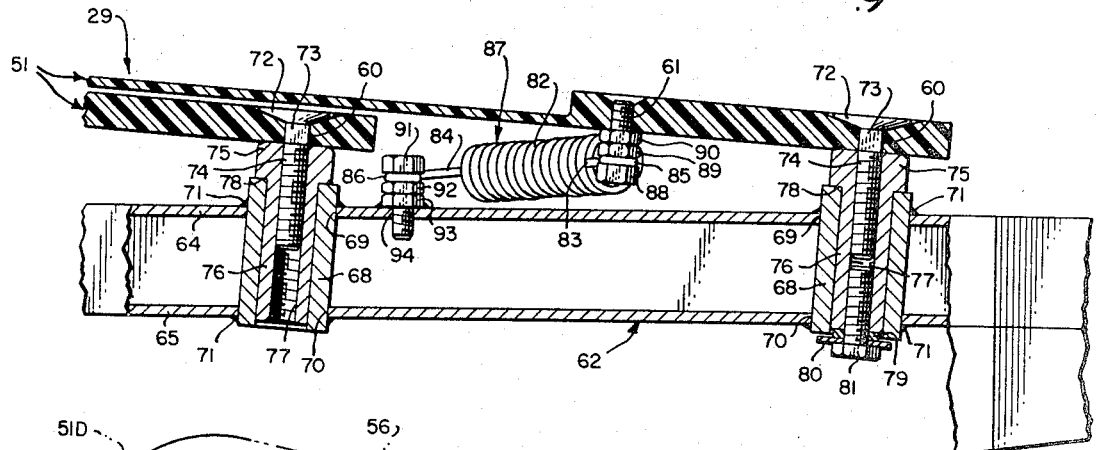
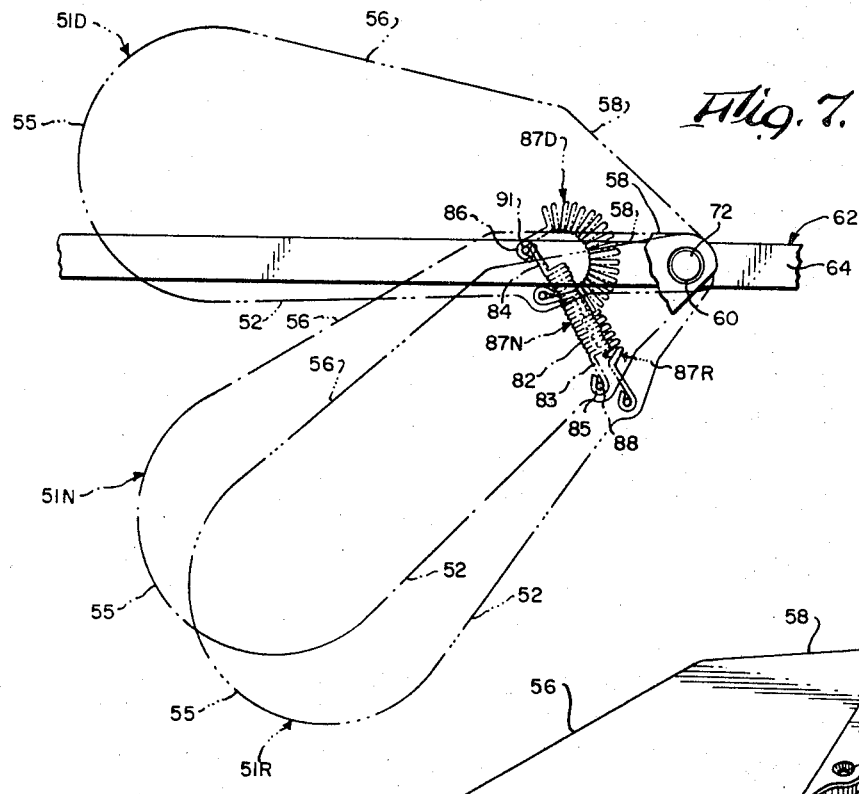
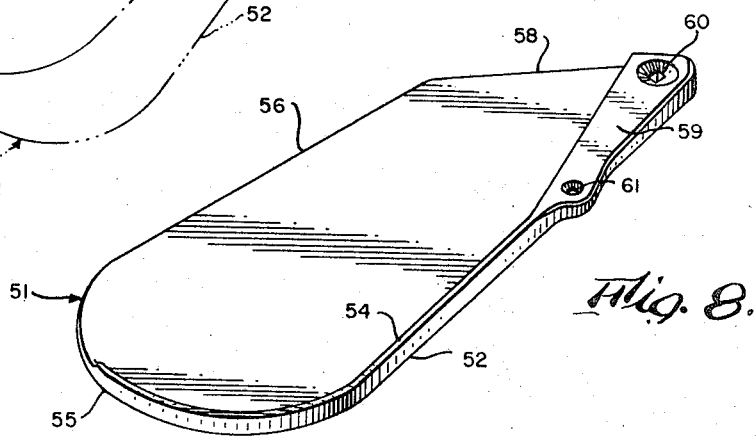

United States Patent Office 3,538,694
Patented Nov. 10, 1970

3,538,694
FRUIT COLLECTOR APPARATUS FOR
HARVESTERS
Robert L. Holloway, Snyder, N.Y., assignor to Chisholm-Ryder Company, Inc., Niagara Falls, N.Y., a corporation of New York
Filed July 1, 1969, Ser. No. 838,190
Int. Cl. A01g 19/00
U.S. Cl. 56—330     12 Claims

ABSTRACT OF THE DISCLOSURE

A fruit harvester adapted to travel along a row of fruit-bearing plants, such as grape vines mounted on trellis wires strung between posts, which has fruit collector apparatus closing off the space under the upper foliage of the plants which bears the fruit to catch and direct falling harvested fruit toward laterally spaced conveyors, such apparatus including two series of inclined and pivotally mounted shutters overlapping one another in each series and those in one series also overlapping those in the other series, the shutters severally being yieldingly maintained in a normal space-closing position by spring means but displaceable therefrom when encountering a post or plant trunk and when clear of the same returning to said normal space-closing position, characterized by said spring means having a substantially zero spring rate effective to resist such displacement with a substantially constant force and also having a relatively high spring rate effective to resist over-travel on return of the shutter.

BACKGROUND OF THE INVENTION

It is known to provide a fruit harvester which dislodges fruit as it travels along a row of plants and also includes closure means for catching and directing falling fruit toward laterally disposed and spaced conveyors. For example, such apparatus is shown in United States Pat. No. 3,126,692 to Weygandt which even discloses pivoted shutters which are forced out of the way by the stalks of the plants. Such a shutter arrangement has been attempted to be used on a grape harvester of the general type disclosed in United States Pat. No. 3,439,482 to Orton so that the shutters replace the closure means shown in this patent. As arranged in a grape harvester, such shutters are not only displaced by the stalks of the grapevines, but also by the posts which support wires stretched therebetween on which the vines are trained. Such posts vary in size from 2-inch cylindrical metal pipes to 5-inch round or square wooden posts, including 10-inch square wooden anchor posts at the end of a row. Also, the harvester is not always moved centrally relative to said posts. As a consequence the shutters must be arranged to accommodate a large displacement or swing, not only due to the variable size of the posts and stalks but also because some post may be out of line or the harvester may not be moved centrally along the row of vines.

It will thus be seen that shutters as applied to a grape harvester of the general type referred to are subjected at times to a large displacement. When released by the displacing object such as a post or plant trunk, the shutter must return to its normal space-closing, grape-catching position. The return movement was usually accomplished by release of a spring that was compressed during displacement of the shutter, as disclosed in said Weygandt patent. Such a spring has a rate such that the resistance to displacement increases with the amount of displacement. If released after a large displacement the shutter is urged to its normal position by a relatively high force. If the normal shutter position is limited by mechanical parts abuttingly engaging, as disclosed in said Weygandt patent, the shutter is subjected to stress and strain when these parts engage to stop return movement of the shutter, of considerable amount when the return is from extensive displacement. This shocks the shutter and it has been found that the pounding so taken by the shutter and its mount result in short life of the affected parts, frequent break-downs and high maintenance effort and cost.

SUMMARY OF THE INVENTION

The present invention relates to mounting shutters in a fruit harvester, particularly a grape harvester of the general type disclosed in said Orton patent, so that the above noted disadvantages of prior shutter arrangements are overcome.

More particularly, an important advantage of the inventive shutter arrangement is that the shutters are displaced from their normal space-closing, fruit-collecting position by spring means which have a substantially zero spring rate so that the resistance to displacement away from such position is a substantially constant force regardless of the amount of displacement. This saves wear and tear on the shutters and their mountings.

Another important advantage of the inventive shutter arrangement is that the shutters are not unyieldingly mechanically stopped in returning to their normal position; rather are yieldingly stopped by the aforementioned spring means so arranged and constructed that it resists over-travel on return with a relatively high spring rate, thus reducing shocks to the shutters and their pivotal mountings.

Another outstanding feature of the present invention is that the shutters with their pivotal mountings are arranged in two banks separately removable as a unit for easy cleaning, as by being hosed with water.

Other advantages of the inventive shutter arrangement include the provision of lightweight but durable shutters, simple and relatively inexpensive in construction, as is also the manner of their pivotal mounting.

Still other advantages and features of the present invention will be apparent from the following detailed description of preferred embodiments thereof shown in the accompanying drawings.

BRIEF DESCRIPTION OF THE DRAWINGS

FIG. 2 is a horizontal sectional view thereof taken on line 2—2 of FIG. 1.

FIG. 3 is a fragmentary enlarged vertical transverse sectional view thereof taken on the offset line 3—3 of FIG. 2.

FIG. 4 is a perspective view of a shutter frame mount bracket forming part of the shutter arrangement.

FIG. 5 is a perspective view of a frame mount bracket for a conveyor at each side of the shutter arrangement.

FIG. 6 is a fragmentary enlarged vertical longitudinal sectional view through a shutter rail assembly taken generally on line 6—6 of FIG. 2.

FIG. 7 is a fragmentary enlarged top plan view of a shutter rail and showing several positions of a shutter and the spring means associated therewith relative to such rail.

FIG. 8 is a perspective elevational view of a shutter by itself.

DESCRIPTION OF THE PREFERRED EMBODIMENTS

FIGS. 1–8

The harvester illustrated is adapted for the harvesting of grapes, although it is to be understood that the present invention is not limited to the harvesting of grapes, but is applicable to the harvesting of other fruits, such as berries or the like.

Figure 1:
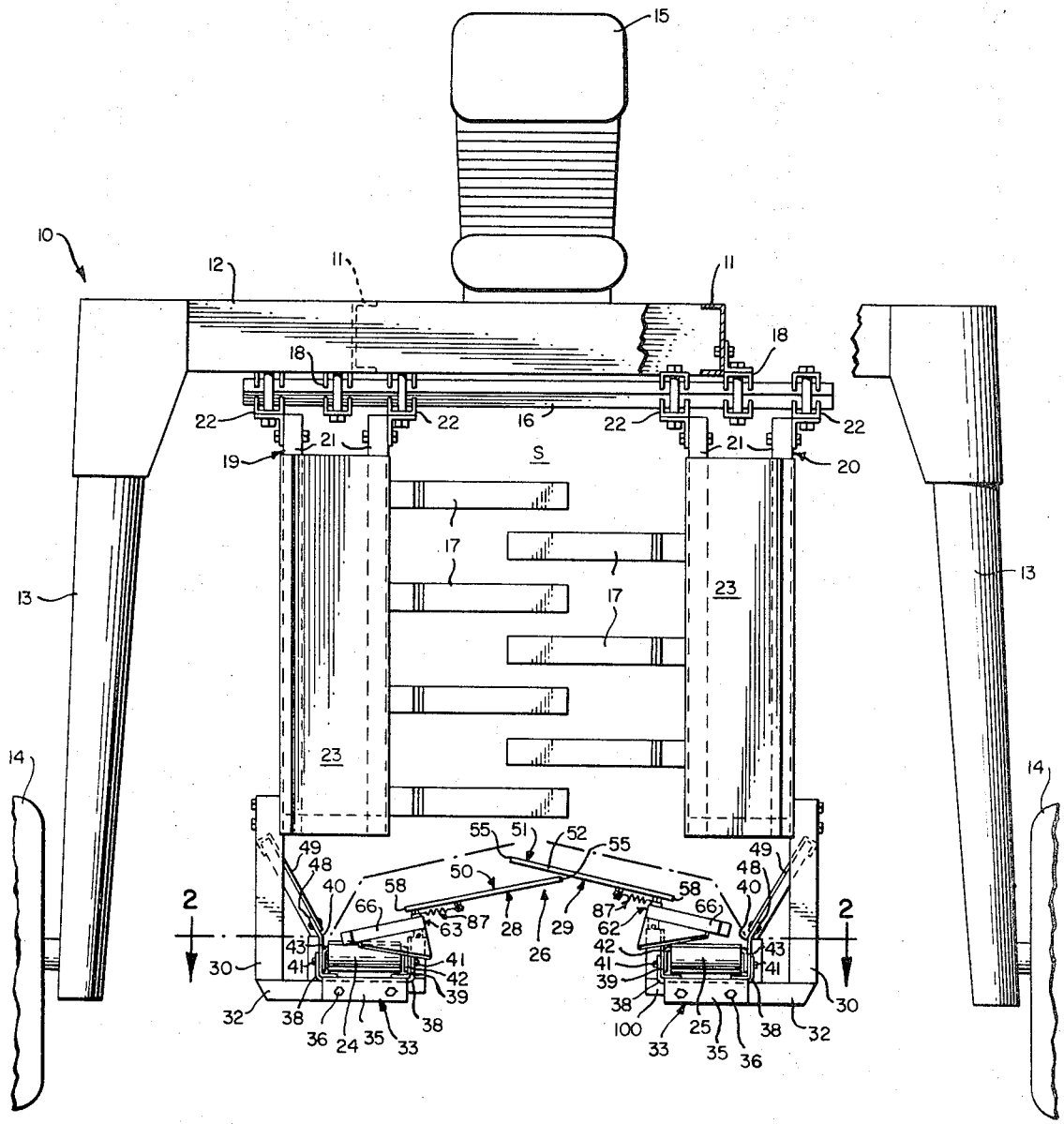
FIG. 1 is a fragmentary front elevational view of a grape harvester including a shutter arrangement embodying one preferred form of the present invention.

The grape harvester embodying one preferred form of shutter arrangement is shown in FIG. 1 as comprising a frame represented generally by the numeral 10 including a pair of transversely spaced horizontal longitudinal members 11 connected at their opposite ends by a pair of horizontal transverse members the front one of which is indicated at 12. The outboard end of each such transverse member has a rigid depending leg 13 on the lower end of which is suitably mounted a ground engaging wheel 14. Thus an inverted U-shaped wheeled frame is provided which can be self-propelled if provided with an engine as indicated at 15 and other necessary drive and control mechanism (not shown). If desired instead, the frame can be towed by an offset tractor or other suitable draft vehicle.

As shown in FIG. 1, the harvester frame also includes at least a pair of longitudinally spaced transverse frame mount members, only the front one of which is indicated at 16. Such member may be a square tubular channel suitably attached to longitudinal members 11 of the main frame of the harvester by the clamp means indicated at 18. A pair of transversely spaced subframe assemblies 19 and 20 hang rigidly from the main frame mount members such as front member 16. Each of these subframe assemblies includes front and rear pairs of vertical subframe members, the front pair being indicated at 21 clamped to member 16 by clamps 22.

The fore and aft inner subframe members 21 define a way or space S through which a row of grapevines passes. An inclined entrance guide plate 23 is suitably arranged on each assembly 19 and 20 at the front end of space S to guide the vines thereinto.

Arranged in space S between subassemblies 19 and 20 are shown several pairs of shaker bar members individually represented by the numeral 17. Suitable power driven means (not shown) are adapted to move these shaker bars so that when the same engage a portion of a grapevine arranged therebetween the grapes can be dislodged. Such a shaker bar assembly can be reciprocated transversely of the line of travel of the harvester, as shown typically by the grape harvester disclosed in said Orton patent, or the shaker bars can be oscillated about vertical axes, as disclosed for panels in said Weygandt patent.

Grape collecting means are shown as arranged below space S which include a pair of conveyors 24 and 25 suitably supported on their respective subframe assemblies 19 and 20 and a tent-like shutter arrangement represented generally by the numeral 26 and including a lower shutter assembly 28 and an upper shutter assembly 29.

Conveyors 24 and 25 are shown as supported in a similar manner except for reversal and hence a description of one is intended to apply to the other. A pair of front and rear hanger members 30 and 31 respectively, are shown as connected rigidly to and forming part of the subframe assembly 19. The lower ends of these hangers 30 and 31 severally have an inwardly extending horizontal rigid arm 32. Each such arm supports a bracket indicated generally by the numeral 33 and illustrated best in FIG. 5. This bracket includes a horizontal bar part 34 which extends over the top of the corresponding arm 32, depending flanges 35 on opposite edges of such bar, these flanges embracing the front and rear sides of the bar and being suitably secured thereto by fasteners such as screws 36 extending through alined holes provided in these flanges 35 and arm 32. Bracket 33 also includes a pair of upstanding flanges 38.

An L-shaped inside rail 39 extends along front and rear inner flanges 38. A generally L-shaped outside rail 40 extends along front and rear outside flanges 38. Suitable fasteners 41 secure these rails and flanges together, passing through holes provided in these elements. Arranged inside of inner rail 39 is an inverted L-shaped plate 42. Arranged against the inside of outer rail 40 is an inverted L-shaped plate 43.

These inverted L-shaped plates are also held by the fasteners 41. The inturned coplanar flanges of these plates 42 and 43 support the upper flight of conveyor 24 which is shown as an endless belt having transverse cleats spaced longitudinally at intervals therealong. The web passes around front and rear rollers 44 and 45, respectively, these rollers being arranged transversely of and suitably journalled on rails 39 and 40.

Suitable means (not shown) are provided for moving the endless conveyors 24 and 25 so that as harvested grapes collect on their upper flights this fruit is transported toward the rear end of the harvester where it is dumped onto an elevator conveyor 46 which carries it to the ultimate point of collection.

Outer rail 40 is shown as having an upwardly and outwardly inclined flange 48 to which is suitably attached a deflector plate 49 which extends longitudinally of the harvester.

Shutter assembly 28 includes a plurality of first overlapping shutters 50 arranged along conveyor 24, and shutter assembly 29 includes a plurality of second overlapping shutters 51 arranged along conveyor 25. The bank of shutters 50 are inclined downwardly and laterally toward conveyor 24. The other bank of shutters 51 are inclined downwardly and laterally toward conveyor 25. Shutters 51 extend over shutters 50 so that the lower end of space S is fully closed when both shutters 50 and 51 are in their normal position as depicted for most of the shutters in FIG. 2 and represented by the position N for one of the shutters 51 illustrated in FIG. 7.

When in such normal position, each of shutters 50 and 51 has a leading edge 52 which inclines inwardly of the space S and rearwardly with respect to the direction of travel of the harvester represented by the arrow 53 in FIG. 2. As best shown in FIG. 8 where one of the shutters 51 is depicted, each shutter has a plate-like construction with its said leading edge thickened by an upstanding integral flange 54 which extends along this leading edge and partially around a rounded inner end edge 55 which connects with a trailing edge 56 which extends substantially parallel to leading edge 52. The outer ends of edges 52 and 56 are connected by an outer edge 58 which extends generally along the inner edge of the corresponding one of the conveyors 24 and 25. Each shutter along the outer portion of its leading edge has an integral horizontally thickened tapered body portion as indicated at 59 for the provision of an outer pivot pin mounting hole 60 and an inner spring mounting hole 61. Each of these holes is shown as provided with a countersunk upper end. Hole 60 is square whereas hole 61 is internally threaded.

Preferably each of shutters 50 and 51 is formed of a reinforced fiberglass plastic material which renders it strong and light in weight.

The bank of upper shutters 51 is shown as pivotally mounted on a rail member 62. The bank of lower shutters 50 is shown as mounted on a rail member 63. The specific mounting of each shutter on its corresponding rail is similar from bank to bank and therefore the mounting of the first two shutters 51 on rail 62 as shown in FIG. 6 will be described and is representative also of the mounting of shutters 50 on rail 63.

Each of rails 62 and 63 is shown as a rectangular tube having upper and lower walls 64 and 65, respectively, and a forwardly and outwardly inclined guide arm 66 suitably rigidly secured to the front end thereof. At spaced intervals along the longitudinal extent of each rail 62 or 63 is a cylindrical bearing sleeve 68. Each such sleeve is arranged on the corresponding rail so as to extend through registering holes 69 and 70 provided in upper and lower walls 64 and 65, respectively. Each sleeve is welded to walls 64 and 65 as indicated at 71. Each sleeve is shown as arranged on its rail with its upper end tipped forwardly so that the axis of the sleeve inclines at about a five degree angle with respect to the vertical. As viewed from the end of the rail (FIG. 3), the upper end of each sleeve is tipped outwardly so as to incline to the vertical at about fifteen degrees, this being due to the tipping of the boxlike rail also at fifteen degrees.

Means are provided for pivotally mounting each shutter on its bearing sleeve 68. Still referring to FIG. 6, such means are shown as including an elevator bolt 72 arranged in countersunk hole 60 with the square part 73 of its shank arranged in the square part of this hole and with the externally threaded portion 74 of the shank extending downwardly out of this hole. Threadedly arranged on this shank 74 below the corresponding shutter is an internally threaded nut member 75 which includes an axial extension 76 of reduced transverse dimension and cylindrical periphery which has a slip fit in the bore of sleeve 68 and hence is rotatable relative thereto. The internally threaded bore through nut member 74 is indicated at 77. A downwardly facing shoulder 78 on nut member engages the upper end of sleeve 68.

It will be seen that by tightening nut member 75 on bolt 72 the corresponding shutter can be firmly clamped to rotate with this bolt and by arranging the nut extension 76 in the bearing sleeve 68 the nut and shutter assembly is free to pivot on the sleeve. While the pivot pin of each shutter may be positively retained on its bearing sleeve, such retention is shown as provided only for the foremost shutter 51 since all of the shutters down the line overlap the next one to its rear except for the foremost shutter and therefore the shutters 51 cannot be removed from their respective bearing sleeves unless the foremost shutter is removed. Referring to FIG. 6, the retaining means include a lock washer 79 adapted to engage the lower end of the tubular pivot pin extension 76 of the nut member 75, a retaining washer 80 arranged below the lock washer and below this retaining washer the head of a retaining cap screw 81 the shank of which extends through the registering holes of these washers and screws into the lower end of the internally threaded bore 77 of the nut member. A slight clearance is shown between washer 80 and the lower end of sleeve 68 in order to provide free rotational movement of the shutter.

The rearmost shutter 50' and 51' in each bank of shutters 50 and 51 essentially like its adjacent fellow except that its rounded nose portion has been cut off. This is for the purpose of providing clearance with respect to the corresponding elevator conveyor 46.

Spring means are operatively interposed between each of the shutters 50 and 51 and the corresponding rail 62 or 63 to yieldingly maintain such shutter in a normal space-closing, grape catching position. Such spring means are so constructed and arranged to have a substantially zero spring rate effective to resist pivotal movement of the corresponding shutter in one direction away from its normal position with a substantially constant force, and also to have a relatively high spring rate effective to resist pivotal movement of such shutter in the opposite direction away from said normal position. Each such spring means, as shown typically at 87 for a shutter 51 in FIGS. 6 and 7, includes a wire coil 82 having an integral arm 83 at one end and a similar integral arm 84 at its opposite end. The arm 83 is formed with a loop 85 at its outer end. A similar loop 86 is formed at the outer end of the other arm 84.

As shown typically in FIG. 6, means pivotaly connect the outer end of arm 83 to shutter 51. Such means include a cap screw 88 and a pair of jam nuts 89 and 90. The externally threaded shank of screw 88 extends through loop end 85 and is screwed into the internally threaded hole 61 provided in shutter 51. Between the lower surface of this shutter and the loop end and arranged on the shank of the screw are the two jam nuts 89 and 90. The upper jam nut 90 is tightened against the lower surface of the shutter and in this manner secures the screw against rotation relative to the shutter. The lower jam nut 89 can be tightened against the upper jam nut 90 to provide a spacing relative to the head of cap screw 88 to permit free rotation of loop end 85 on the shank of this cap screw. This is important in order for the spring to be effective as described.

Means are provided for pivotally connecting the outer end of the spring arm 84 on the corresponding shutter rail 62. As shown in FIG. 6, such means include a cap screw 91, an upper jam nut 92 and a lower nut 93. Lower nut 93 is welded to top wall 64 of rail 62. The shank of cap screw 91 extends through the loop end 86 of arm 84, through the upper lock nut 92, through lower fixed nut 93 and through a hole 94 registering therewith provided in upper rail wall 64. By tightening upper lock nut 92 downwardly against lower fixed nut 93, screw 91 is prevented from rotating. The spacing between the shoulder of the head of cap screw 91 and the upper surface of upper lock nut 92 is such as to allow loop end 86 to freely pivot about the axis of the shank of this cap screw.

When a shutter, such as the shutter 51 shown in FIG. 7 is in its normel space-closing, fruit collecting position 51N, the coil portion of the spring member is essentially straight as indicated at 87N. In moving from this normal position in a space-opening direction to a fully displaced position of the shutter represented at 51D, the coil portion of the spring member is flexed as depicted at 87D, the loop end of the arms of this spring member pivoting about the axes of securing screws 88 and 91. During movement from the normal position to the fully displaced position, the spring member 82 has essentially a zero spring rate so that the force resisting such displacement of the shutter 51 remains substantially constant. This displacement is caused by the leading edge 52 of the shutter engaging some sort of an obstacle such as a post in a row of vines such as indicated at P in FIG. 2 or the trunk of a plant.

As the harvester moves along the row, the displaced shutter 51D will drag its leading edge 52 and part of its rounded inner edge 55 over the obstacle such as the post P and when free of the same will be urged by spring member 87 to return to its normal position. In so returning, the momentum of the shutter will tend to carry it beyond its normal position. Such over-travel on return movement of the shutter is depicted by position 51R in FIG. 7. During such over-travel, spring member as depicted at 87R is arranged to have a high spring rate whereby it resists with a relatively high force the displacement of the shutter from the normal position 51N to the over-travel position 51R. In this manner, the shutter over-travel is soon restrained and thereafter the spring 87 contracts to return the shutter from the over-travel position 51R to the normal position 51N.

It will be noted that in allowing such over-travel on return movement of the shutter, the shutter engages no mechanical sops. This eliminates the shock in pounding that would otherwise occur if a portion of the shutter engaged a fixed mechanical stop.

Shutter rail 63 with its shutters 50 thereon is shown as being removably supported as a unit. For this purpose, this rail has a pair of depending stake pins 95, 95 spaced from each other longitudinally of the rail, severally adapted to be received in a socket member 96. Referring to FIG. 4, this socket member 96 is part of a bracket assembly represented generally by the numeral 98 and includes a U-shaped member 99, a horizontal bar 100 and a vertical bar 101, all of these elements being welded together.

The U-shaped member 99 embraces the conveyor rails 39 and 40 and are secured thereto by suitable fasteners 102 extending through holes provided in the upright flanges of this member. The brackets 98 are shown as arranged between the longitudinally spaced hangers 30 and 31 but adjacent the same.

Each stake pin 95 carries a cross pin 103 which limits the depth to which the stake pin enters socket member 96, this cross pin resting on the rim of this socket member.

As shown in FIG. 3, the socket member 96' for the pair of brackets 98' associated with rail 62 is taller than socket member 98 associated with rail 63. In this manner, the cross pin 103' for the stake pins 95' for rail 62 supports this rail at a righer horizontal level or elevation with respect to the other shutter rail 63, thereby permitting shutters 51 to extend over he oher shuters 50.

It will be seen that as the harveser moves along a row of vines the shutters 50 and 51 when in their normal grape collecting position close off the bottom of space S but this space is adapted to open up to allow the passage therethrough of a vine trunk or post. To permit of this, the plant trunk or post engages the leading edges 52 of the shutters, causing them to displace outwards away from their normal position against the substantially constant urging of spring members 87. Upon clearing the plant trunk or post the displaced shutters through their respective spring members return to their normal positions after some slight over-travel.

FIG. 9

Figure 9:
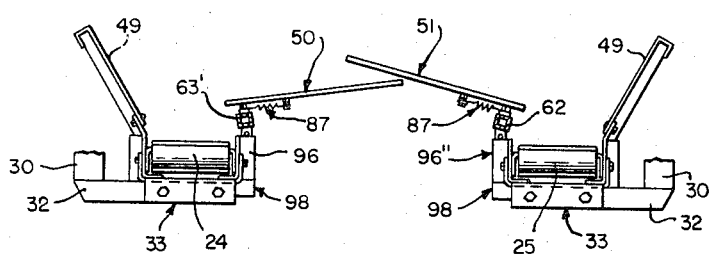
FIG. 9 is a fragmentary front end elevational view of a modified shutter arrangement, this view being comparable generally as to scale as the shutter arrangement forming the lower portion of the harvester shown in FIG. 1.

The modified shutter arrangement shown in FIG. 9 is the same as that shown in FIGS. 1-8, with the exception that socket member 96" is now the same height as the other socket member 96 so that both shutter rails are at the same horizontal level or elevation. However, instead of these shutter rails being tipped relative to the horizon through the same angle, as in the case of the arrangement for rails 62 and 63 shown in the preceding figures, the shutter rail 63' and hence its shutters 50 are tipped at only an angle of ten degrees to the horizon so that an overlapping arrangement of the inner ends of the shutters 50 and 51 is still possible while the rails 62 and 63' are still at the same level or elevation.

What is claimed is:

1. In a fruit harvester adapted to travel along a row of fruit bearing plants having a frame and a pair of laterally spaced conveyors, the improvement which comprises fruit collector apparatus including a plurality of first overlapping shutters arranged along one of said conveyors in the space therebetween and inclined downwardly and laterally toward said one of said conveyors, a plurality of second overlapping shutters arranged along the other of said conveyors in said space and inclined downwardly and laterally toward said other of said conveyors, said first shutters extending over said second shutters, means pivotally mounting each of said first shutters on said frame adjacent said one of said conveyors, means pivotally mounting each of said second shutters on said frame adjacent said other of said conveyors, and spring means operatively interposed between each of said first and second shutters and said frame to yieldingly maintain each such shutter in a normal space-closing position and so constructed and arranged to have a substantially zero spring rate effective to resist pivotal movement of the corresponding shutter in a space-opening direction away from said normal position with a substantially constant force and also having a relatively high spring rate effective to resist pivotal movement of such shutter in the opposite direction away from said normal position.

2. A harvester according to claim 1 wherein each of said first and second shutters when in its said normal position has a leading edge which inclines inwardly of said space and rearwardly of the line of travel of the harvester.

3. A harvester according to claim 2 wherein each of said first and second shutters has a plate-like construction with its said leading edge thickened.

4. A harvester according to claim 3 wherein each of said first and second shutters has a trailing edge generally parallel to said leading edge, a rounded inner edge connecting the inner edges of said leading and trailing edges and an outer edge connecting the outer ends of said leading and trailing edges and extending generally along the inner edge of the corresponding one of said conveyors when the shutter is in its said normal position.

5. A harvester according to claim 2 wherein each of said first and second shutters is pivotally mounted adjacent the outer end of its said leading edge.

6. A harvester according to claim 1 wherein said spring means includes a wire coil having an arm at each end, means pivotally connecting the outer end of one of such arms to its shutter, and means pivotally connecting the outer end of the other of said arms to said frame.

7. A harvester according to claim 2 wherein said frame includes a first rail extending along the inner edge of said one of said conveyors and a second rail extending along the inner edge of said other of said conveyors, each of said first shutters is pivotally mounted at the outer end of its said leading edge on said first rail, each of said second shutters is pivotally mounted at the outer end of its said leading edge on said second rail, and said spring means for said first shutters being operatively interposed between the same and said first rail and for said second shutters being operatively interposed between the same and said second rail.

8. A harvester according to claim 7 wherein said spring means includes a wire coil having an arm at each end, means pivotally connecting the outer end of one of such arms to its shutter, and means pivotally connecting the outer end of the other of said arms to the corresponding one of said rails.

9. A harvester according to claim 8 which further comprises means removably mounting each of said rails on said frame so that each of the rails with its shutters is removable as a unit.

10. A harvester according to claim 9 wherein said removably mounting means includes a pair of upright sockets for each of said rails secured to said frame and a pair of stake pins fixed to and depending from each of said rails and removably inserted in the corresponding pair of said sockets.

11. A harvester according to claim 7 wherein said first rail is arranged at a higher elevation than said second rail, and the inclination of both said first and second shutters is substantially the same.

12. A harvester according to claim 7 wherein both of said rails are arranged at substantially the same level, and the inclination of said first shutters is greater than that for said second shutters.

References Cited

UNITED STATES PATENTS

| | | | |
|---|---|---|---|
| 3,184,908 | 5/1965 | Rust | 56—330 |
| 3,225,894 | 12/1965 | Weygandt et al. | 56—330 |
| 3,255,578 | 6/1966 | Pertics | 56—330 |
| 3,449,895 | 6/1969 | Pertics | 56—330 |
| 2,630,316 | 3/1953 | Foster | 267—1 |

RUSSELL R. KINSEY, Primary Examiner